US012367842B2

(12) United States Patent
Kosuge et al.

(10) Patent No.: US 12,367,842 B2
(45) Date of Patent: Jul. 22, 2025

(54) ELECTRONIC APPARATUS AND METHOD FOR CONTROLLING ELECTRONIC APPARATUS USING FEATURE REGIONS

(71) Applicant: CANON KABUSHIKI KAISHA, Tokyo (JP)

(72) Inventors: Takuya Kosuge, Kanagawa (JP); Hirofumi Urabe, Tokyo (JP); Masahiro Sato, Tokyo (JP); Atsushi Ishii, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 255 days.

(21) Appl. No.: 18/159,573

(22) Filed: Jan. 25, 2023

(65) Prior Publication Data

US 2023/0274714 A1 Aug. 31, 2023

(30) Foreign Application Priority Data

Jan. 28, 2022 (JP) ................................. 2022-012007
Nov. 8, 2022 (JP) ................................. 2022-179042

(51) Int. Cl.
*G09G 3/36* (2006.01)

(52) U.S. Cl.
CPC ....... *G09G 3/36* (2013.01); *G09G 2320/0613* (2013.01); *G09G 2320/0686* (2013.01); *G09G 2340/0464* (2013.01); *G09G 2360/00* (2013.01)

(58) Field of Classification Search
CPC ... G09G 2320/0613; G09G 2320/0686; G09G 2340/0464; G09G 2354/00; G09G 2360/16
See application file for complete search history.

(56) References Cited

U.S. PATENT DOCUMENTS

| | | | | |
|---|---|---|---|---|
| 9,293,115 B2 * | 3/2016 | Furumoto | G09G 5/10 |
| 2009/0150069 A1 * | 6/2009 | Iao | G01C 21/3614 701/426 |
| 2009/0271745 A1 * | 10/2009 | Sakamoto | G06F 3/0481 707/999.107 |
| 2013/0207892 A1 * | 8/2013 | Kim | H04N 21/4222 345/157 |
| 2014/0187936 A1 * | 7/2014 | Nakamura | A61B 5/7425 600/407 |
| 2014/0219576 A1 * | 8/2014 | Yokoyama | H04N 23/67 382/255 |

FOREIGN PATENT DOCUMENTS

JP 2021173901 A 11/2021

* cited by examiner

*Primary Examiner* — Nicholas R Wilson
(74) *Attorney, Agent, or Firm* — Canon U.S.A., Inc., IP Division

(57) ABSTRACT

An electronic apparatus includes an acquiring unit, a position acquiring unit, and a control unit. The acquiring unit is configured to acquire an image. The position acquiring unit is configured to acquire a position of a display item which is displayed at a currently selected position in the image. The control unit, in a case where the image includes a plurality of feature regions, selects one of the plurality of feature regions based on a distance between each of the plurality of feature regions and the display item.

20 Claims, 18 Drawing Sheets

FIG. 3

| COORDINATES | BRIGHTNESS (cd/m$^2$) |
|---|---|
| (0, 0) | 100 |
| ... | ... |
| (1400, 250) | 800 |
| ... | ... |
| (400, 300) | 900 |
| ... | ... |
| (1600, 400) | 210 |
| ... | ... |
| (900, 600) | 850 |
| ... | ... |
| (1200, 700) | 700 |
| ... | ... |
| (1919, 1079) | 100 |

FIG. 6

| COORDINATES | BRIGHTNESS (cd/m$^2$) |
|---|---|
| (1400,250) | 800 |
| (400,300) | 900 |
| (1600,400) | 210 |
| (900,600) | 850 |
| (1200,700) | 700 |

FIG. 9A

| COORDINATES | BRIGHTNESS (cd/m$^2$) | DISTANCE TO CURSOR (CURSOR DISTANCE) |
|---|---|---|
| (1400,250) | 800 | 223.6068 |
| (400,300) | 900 | 1110.1800 |
| (1600,400) | 210 | 111.8034 |
| (900,600) | 850 | 618.4658 |
| (1200,700) | 700 | 390.5125 |

FIG. 9B

| COORDINATES | BRIGHTNESS (cd/m$^2$) | DISTANCE TO CURSOR (CURSOR DISTANCE) |
|---|---|---|
| (1400,250) | 800 | 520.0153 |
| (400,300) | 900 | 538.5165 |
| (1600,400) | 210 | 761.5773 |
| (900,600) | 850 | 500 |
| (1200,700) | 700 | 670.8203932 |

FIG. 10

| COORDINATES | BRIGHTNESS (cd/m²) | DISTANCE TO CENTER (CENTER DISTANCE) |
|---|---|---|
| (1400,250) | 800 | 526.9725 |
| (400,300) | 900 | 609.2618 |
| (1600,400) | 210 | 655.1336 |
| (900,600) | 850 | 84.85281 |
| (1200,700) | 700 | 288.444102 |

FIG. 12

| COORDINATES | BRIGHTNESS ($cd/m^2$) | DISTANCE TO CURSOR (CURSOR DISTANCE) | SIZE | CURSOR EVALUATION VALUE |
|---|---|---|---|---|
| (1400,250) | 800 | 223.6068 | 110000 | 491.934955 |
| (400,300) | 900 | 1110.1800 | 30000 | 27.02264095 |
| (1600,400) | 210 | 111.8034 | 10000 | 89.4427191 |
| (900,600) | 850 | 618.4658 | 20000 | 32.33808334 |
| (1200,700) | 700 | 390.5125 | 80000 | 204.8590079 |

FIG. 13

| COORDINATES | BRIGHTNESS ($cd/m^2$) | DISTANCE TO CENTER (CENTER DISTANCE) | SIZE | CENTER EVALUATION VALUE |
|---|---|---|---|---|
| (1400,250) | 800 | 526.9725 | 110000 | 208.7395512 |
| (400,300) | 900 | 609.2618 | 30000 | 49.23991232 |
| (1600,400) | 210 | 655.1336 | 10000 | 15.26406277 |
| (900,600) | 850 | 84.85281 | 20000 | 235.7022604 |
| (1200,700) | 700 | 288.444102 | 80000 | 277.3500981 |

ELECTRONIC APPARATUS AND METHOD FOR CONTROLLING ELECTRONIC APPARATUS USING FEATURE REGIONS

BACKGROUND

Technical Field

One disclosed aspect of the embodiments relates to an electronic apparatus and a method for controlling the electronic apparatus.

Description of the Related Art

Lately various standards, such as the perceptual quantizer (PQ) and the hybrid log-gamma (HLG), have been used as the standards of image signals having wide dynamic ranges. These dynamic ranges are called a "high dynamic range (HDR)". A user demand who use images having the HDR is that a position of a feature region (e.g. high brightness region, low brightness region) can be checked in an image having the HDR.

Japanese Patent Application Publication No. 2021-173901 discloses a technique that detects a pixel having a highest brightness value in a high brightness region that is larger than a predetermined size in an image, based on a brightness distribution of the image, and the brightness value of the detected pixel is displayed around the pixel.

Another demand is that one appropriate feature region can be selected from a plurality of feature regions in order to check this feature region closely. Japanese Patent Application Publication No. 2021-173901, however, discloses only a technique to display the highest brightness value for each of a plurality of high brightness regions, and does not disclose a technique to select one high brightness region (feature region).

SUMMARY

An aspect of the disclosure is an electronic apparatus including at least one memory and at least one processor which function as an acquiring unit, a position acquiring unit, and a control unit. The acquiring unit is configured to acquire an image. The position acquiring unit is configured to acquire a position of a display item which is displayed at a currently selected position in the image. The control unit is configured to select one of a plurality of feature regions based on a distance between each of the plurality of feature regions and the display item in a case where the image includes the plurality of feature regions.

An aspect of the disclosure is a method for controlling an electronic apparatus including an acquiring step, a position acquiring step, and a control step. The acquiring step acquires an image. The position acquiring step acquires a position of a display item which is displayed at a currently selected position in the image. The control step, in a case where the image includes a plurality of feature regions, selects one of the plurality of feature regions based on a distance between each of the plurality of feature regions and the display item.

Further features of the disclosure will become apparent from the following description of exemplary embodiments with reference to the attached drawings.

BRIEF DESCRIPTION OF THE DRAWINGS

FIG. 3 is a table indicating a brightness distribution according to Embodiment 1.

FIG. 6 is a table indicating the highest brightness and coordinates of the highest brightness pixel according to Embodiment 1.

FIGS. 9A and 9B are tables indicating a cursor distance according to Embodiment 1.

FIG. 10 is a table indicating a center distance according to Embodiment 1.

FIG. 12 is a table indicating a cursor evaluation value according to Embodiment 2.

FIG. 13 is a table indicating a center evaluation value according to Embodiment 2.

DESCRIPTION OF THE EMBODIMENTS

Embodiments of the disclosure will be described with reference to the drawings. Same or equivalent composing elements, members or processing steps indicated in each drawing are denoted with a same reference sign, and redundant description may be omitted. In each drawing, a part of composing elements, members and processing steps will be omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions.

It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

In the following description, a region of a plurality of pixels, of which brightness values are higher than a first brightness value, is called a "high brightness region". A region of a plurality of pixels, of which brightness values are lower than a second brightness value (brightness value lower than the first brightness value), is called a "low brightness region". A region having a distinctive feature, such as a high brightness region or a low brightness region, is called a "feature region".

Figure 16:
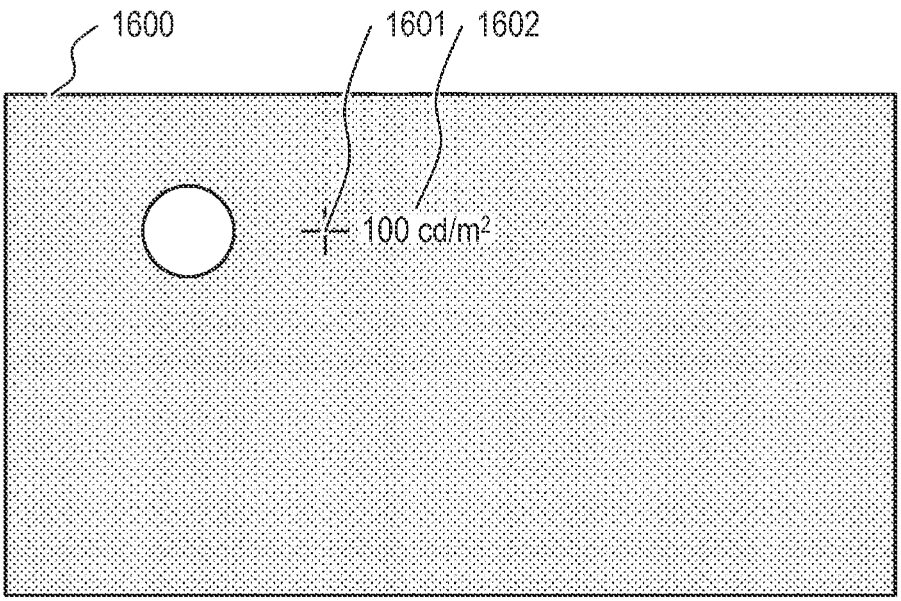
FIG. 16 is a diagram indicating a pixel value display function for an image.

FIG. 16 is a diagram illustrating a function of displaying a pixel value of an image in a display control device. As indicated in FIG. 16, the display control device displays an image 1600, a cursor 1601 which is superimposed and displayed on the image 1600, and a brightness value 1602. The cursor 1601 is an indicator (display item) displayed at a position (currently selected position) of a pixel for which the brightness value is displayed. The brightness value 1602 is a brightness value of the pixel at the position indicated by the cursor 1601. In the following description, it is assumed that the display control device displays the brightness value of the pixel, however the brightness value is an example of a pixel value displayed on the image, and the following description is also applicable in a case of displaying a different value indicating a feature of the pixel, such as the RGB values.

Embodiment 1

In Embodiment 1, a display control device 100, which selects one feature region out of a plurality of feature regions, considering a distance between each of a plurality of feature regions and a currently selected position (display item) (and a distance between each of the plurality of feature regions and a center of the image), will be described.

A possible method for selecting one feature region out of a plurality of feature regions (a method other than Embodiment 1) is a method of the display control device sequentially searching in the image in a top to bottom direction, and selecting a feature region that is detected first, for example. Here in the case where a plurality of feature regions are disposed at a same height, for example, inside the image is searched in the left to right direction, and a feature region that is detected first is selected. In this method, however, the selected feature region is a feature region selected without considering user operation or the like. Therefore it is quite likely that a feature region desired by the user is not selected.

In the following, an example of selecting one high brightness region as a feature region will be described. However, any region, instead of the high brightness region, may be used as the feature region. For example, instead of the high brightness region, a region that can be detected from an image based on a predetermined standard (e.g. low brightness region, high saturation region) may be used. In a case where an object that can be detected by machine learning or the like (predetermined type of object, such as a person, an animal or a car) is included in an image, the region of this object may be used as the feature region instead of the high brightness region. This is the same for embodiments other than Embodiment 1.

Figure 1:
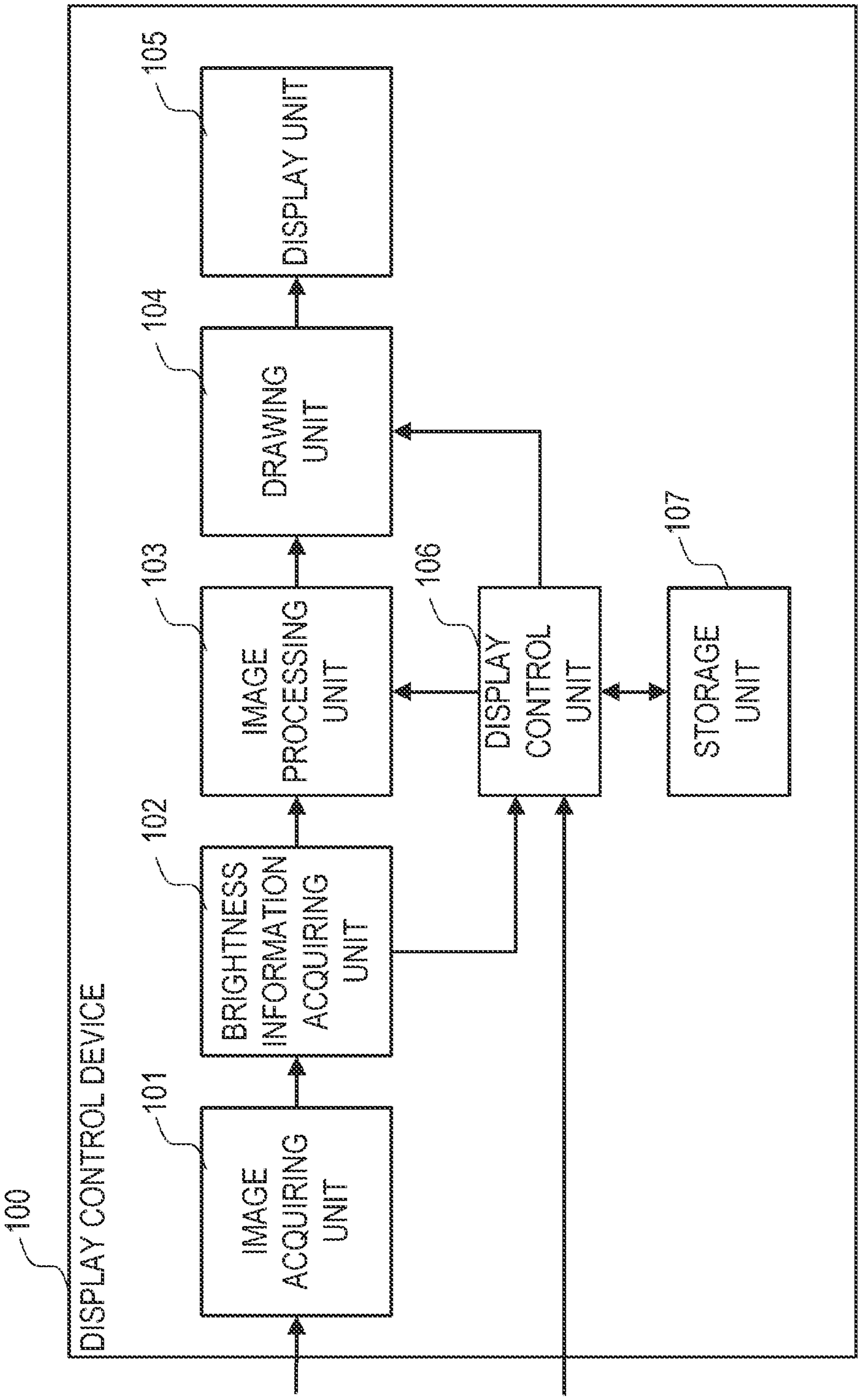
FIG. 1 is a block diagram of a display control device according to Embodiment 1.

FIG. 1 is a block diagram depicting an example of a configuration of a display control device 100 according to Embodiment 1. The display control device 100 may be any electronic apparatus (information processing device), such as a digital camera and a smartphone, as long as the electronic apparatus can control display of a display unit (display device). The display control device 100 includes an image acquiring unit 101, a brightness information acquiring unit 102, an image processing unit 103, a drawing unit 104, a display unit 105, a display control unit 106 and a storage unit 107. Therefore the display control device 100 having a display unit 105 may be regarded as a display device. As mentioned above, any one of the image acquiring unit 101, the brightness information acquiring unit 102, the image processing unit 103, the drawing unit 104, the display unit 105, the display control unit 106 and the storage unit 107 may be a circuit or a function performed by a programmable device or circuit when executing a program or instructions from a memory.

The image acquiring unit 101 acquires image signals, which are moving image contents constituted of a plurality of frames (images), from an external device (e.g. imaging device, reproducing device). The image acquiring unit 101 outputs the acquired image signals to the brightness information acquiring unit 102 as an image for each frame. The image in each frame is constituted of a plurality of pixels (e.g. in the case of an image signal of which resolution is 1920×1080, the number of pixels is 1920×1080=2073600). The image acquiring unit 101 is an input terminal conforming to the serial digital interface (SDI) or the high-definition multimedia interface (HDMI®), for example.

Figure 2:
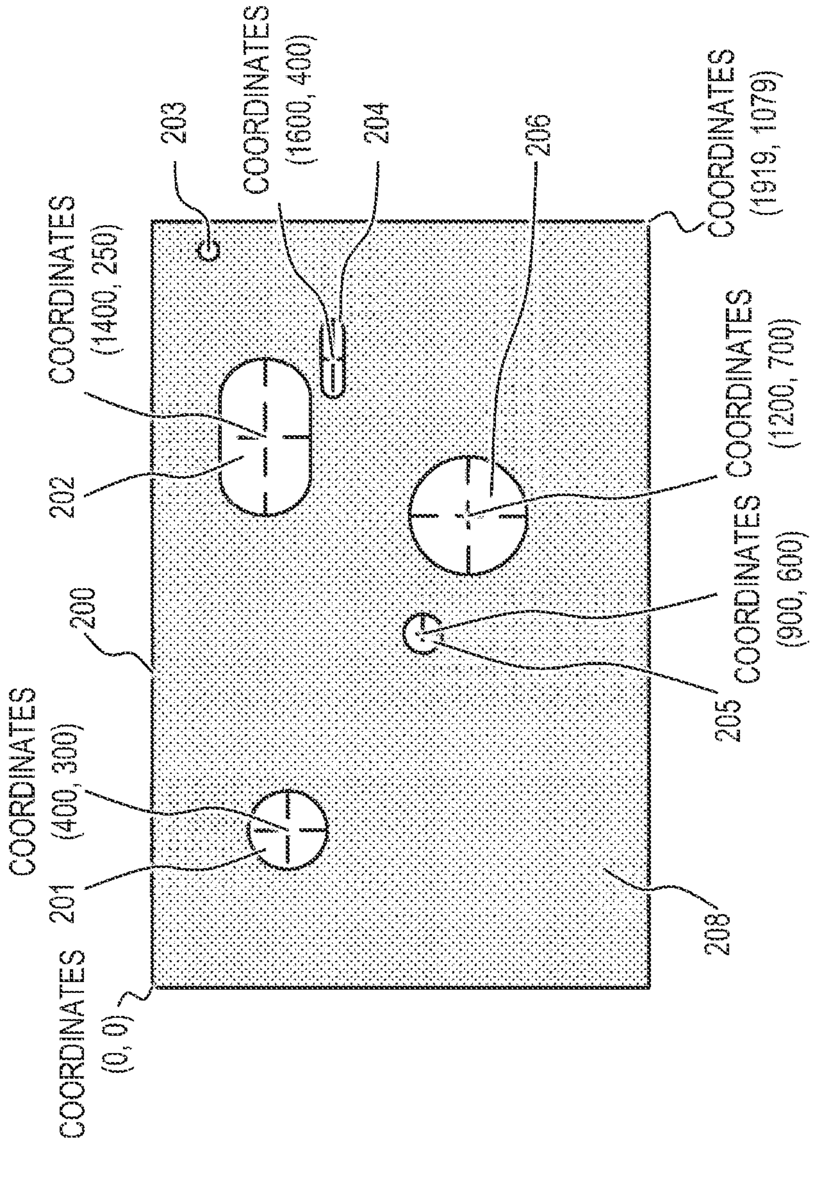
FIG. 2 is a diagram depicting an image according to Embodiment 1.

FIG. 2 indicates an image 200, which is an example of the image of which resolution (number of pixels in horizontal direction×number of pixels in vertical direction) is 1920×1080. In the image 200 in FIG. 2, the coordinates of the position (position x in horizontal direction, position y in vertical direction) corresponding to a pixel at the upper left corner are (0, 0), and the coordinates of the position corresponding to a pixel at the lower right corner are (1919, 1079). In coordinates (x, y) of a position of a pixel, x is a greater value as the position of the pixel is more toward the right, and y is a greater value as the position of the pixel is lower.

The image 200 indicated in FIG. 2 includes 6 objects: 201, 202, 203, 204, 205 and 206, and a background 208. Here in the image 200, it is assumed that the brightness values of the pixels constituting the background 208 are all the same.

For example, it is assumed that the brightness value of each pixel constituting the object 201 is 900 cd/$m^2$, the brightness value of each pixel constituting the object 202 is 800 cd/$m^2$, and the brightness value of each pixel constituting the object 203 is 700 cd/$m^2$. It is also assumed that the brightness value of each pixel constituting the object 204 is 210 cd/$m^2$, the brightness value of each pixel constituting the object 205 is 850 cd/$m^2$, and the brightness value of each pixel constituting the object 206 is 700 cd/$m^2$. Further, in the image 200, it is assumed that the size of the object 201 is 30000, the size of the object 202 is 110000, and the size of the object 203 is 80. It is also assumed that the size of the object 204 is 10000, the size of the object 205 is 20000, and the size of the object 206 is 80000. Here a size of an object in an image refers to a total number of pixels corresponding to a region occupied by the object in the image. However, the size is not limited to a number of pixels, but may be indicated by a different index to indicate a size of an object in an image (e.g. area of a region occupied by the object).

The brightness information acquiring unit 102 analyzes the image outputted from the image acquiring unit 101, and outputs the analysis result to the display control unit 106. On the other hand, the brightness information acquiring unit 102 outputs the image outputted from the image acquiring unit 101 to the image processing unit 103. For each acquired image, the brightness information acquiring unit 102 converts the signal values of all the pixels of the image into brightness values, and outputs the information on the converted brightness value of each pixel to the display control unit 106 as the brightness distribution. Here the brightness distribution is used, but a distribution of information other than the brightness values (e.g. gradation values) may be used instead of the brightness distribution. The brightness information acquiring unit 102 also encloses a frame memory, and writes the image outputted from the image acquiring unit 101 to the frame memory. Then the brightness information acquiring unit 102 converts the signal values of all the pixels of the image into the brightness values with reference to the frame memory in which the image was written.

To convert the signal value of a pixel into a brightness value, an electro-optical transfer function (EOTF) of PQ, HLG, gamma 2.2 or the like is used. FIG. 3 indicates the brightness distribution of the pixels acquired by analyzing the image 200 indicated in FIG. 2. Here the brightness distribution is generated so as to indicate the brightness value of each pixel in the image. According to the brightness distribution in FIG. 3, the brightness value of the pixel at coordinates (1400, 250), for example, is 800 cd/$m^2$. In the same manner, the brightness value is indicated for the coordinates of each pixel. The image processing unit 103 performs image processing on the image outputted from the brightness information acquiring unit 102. The image processing unit 103 outputs the image, generated after performing the image processing, to the drawing unit 104. The image processing performed by the image processing unit 103 is processing to convert an image outputted from the brightness information acquiring unit 102 into data that can be handled by the display unit 105, based on the various settings set by the display control unit 106. The various settings here are, for example, the EOTF setting, color gamut setting (e.g. ITU-R BT.709 or ITU-R BT.2020), and signal range setting (e.g. limited range or full range).

The drawing unit 104 draws the brightness value of a currently selected pixel and a cursor (indicator: display item) to indicate the current position of the pixel (currently selected position), for the image outputted from the image processing unit 103. The drawing unit 104 outputs the image, in which the brightness value of the pixel and the cursor are drawn, to the display unit 105 as the display image.

The display unit 105 is a display including a backlight and a liquid crystal panel, for example. The display unit 105 displays a display image that is outputted from the drawing unit 104.

The display control unit 106 is a processing circuit (control circuit) that executes programs stored in the storage unit 107 and controls each component of the display control device 100. The display control unit 106 receives an instruction of the user operation performed via buttons (not illustrated) or the like disposed on the display control device 100. The display control unit 106 controls the processing of the image processing unit 103 based on the various settings (e.g. the EOTF setting, color gamut setting, signal range setting), which are set by the user operation.

Further, the display control unit 106 determines a pixel for which the brightness value of the pixel is drawn (drawing pixel), and controls the drawing unit 104. For example, when an operation to instruct automatic determining of a drawing pixel (hereafter called "automatic determination operation") is performed, the display control unit 106 controls the drawing unit 104 so that the brightness value of the pixel at a determined position based on the brightness distribution is displayed (see FIG. 4). On the other hand, when an operation to instruct determining of a drawing pixel by a user operation (manually) (hereafter called "manual determination operation") is performed, the display control unit 106 controls the drawing unit 104 so that a brightness value of the pixel at a position corresponding to the user operation (operation amount) performed on the four-direction key. Regardless which one of the automatic determination operation and the manual determination operation is performed, the drawing unit 104 moves the cursor to the pixel for which the brightness value is displayed.

The storage unit 107 includes a non-volatile memory that stores programs for the display control unit 106 to execute. The storage unit 107 also stores information that the user set in advance (setting of pixel value display, brightness threshold of high brightness region, and size threshold of high brightness region). The display control unit 106 refers to this information when each processing to be described below is executed. Here the setting of the pixel value display is the setting of enabled/disabled of the pixel value display function of the display control device 100. The brightness threshold of the high brightness region is a threshold to determine whether or not the brightness value of the pixel is higher than a predetermined brightness value ("first brightness value" mentioned above). The size threshold of the high brightness region is a threshold to determine whether or not the size of the high brightness region is larger than a predetermined size.

In the case where the pixel value display function is enabled, the display control unit 106 calculates the coordinates of a pixel for which the pixel value is displayed and the brightness value of this pixel based on the brightness distribution. Then the display control unit 106 outputs the calculated coordinates of the pixel and brightness value of this pixel to the drawing unit 104.

(Drawing Pixel Determining Processing) The drawing pixel (pixel for which the brightness value is displayed) determining processing executed by the display control unit 106 will be described with reference to the flow chart in FIG. 4. When the user instructs to execute the automatic determination operation, the display control unit 106 acquires the brightness distribution for the image (frame), which was outputted from the image acquiring unit 101 at the time of this automatic determination operation (see FIG. 3), from the brightness information acquiring unit 102. Then when the brightness distribution is received from the brightness information acquiring unit 102, the display control unit 106 starts the operations of the flow chart in FIG. 4 for the image outputted from the image acquiring unit 101. The operations of this flow chart are implemented by the display control unit 106 executing the programs stored in the storage unit 107 (non-volatile memory).

In operation S401, the display control unit 106 refers to the setting of the pixel value display, and determines whether or not the pixel value display function is enabled. Processing advances to operation S402 if the pixel value display function is enabled. The processing of this flow chart ends if the pixel value display function is disabled.

In operation S402, the display control unit 106 detects a high brightness region in the image based on the brightness distribution acquired from the brightness information acquiring unit 102. Specifically, the display control unit 106 searches the brightness distribution, and classifies a pixel indicating a brightness value higher than a brightness threshold of the high brightness region as a high brightness pixel; and classifies a pixel indicating a brightness value lower than the brightness threshold of the high brightness region as a low brightness pixel. Then the display control unit 106 determines whether or not an adjacent high brightness pixel exists, sequentially from the high brightness pixel on the upper left of the image, and if an adjacent high brightness pixel exists, this adjacent high brightness pixel is classified as a pixel belonging to the same high brightness region. Thereby the display control unit 106 detects a plurality of pixels, classified to a same high brightness region, as one high brightness region. Using the same method as this, a low brightness region may also be detected.

For example, in the case where the brightness threshold of the high brightness regions is set to 203 cd/$m^2$ in the image 200 indicated in FIG. 2, the high brightness regions detected by the display control unit 106 are the regions of an object 201, object 202, object 203, object 204, object 205 and object 206. Here the brightness value of each pixel of the object 201 is 900 cd/$m^2$, the brightness value of each pixel of the object 202 is 800 cd/$m^2$, and the brightness value of each pixel of the object 203 is 700 cd/$m^2$. Further, the brightness value of each pixel of the object 204 is 210 cd/$m^2$, the brightness value of each pixel of the object 205 is 850 cd/$m^2$, and the brightness value of each pixel of the object 206 is 700 cd/$m^2$.

In operation S403, the display control unit 106 refers to the size threshold of the high brightness region, and selects only regions of which size is larger than this size threshold (a number of pixels is larger than a predetermined number), out of the high brightness regions detected in operation S402. In other words, the display control unit 106 excludes a region having a predetermined area or less, or smaller than this size threshold out of the high brightness regions. For example, if the size threshold of the high brightness region is set to 100 in the image 200 in FIG. 2, the region of the object 203, of which size is 80, is excluded from the high brightness regions.

The reason the high brightness region, of which size is less than the size threshold, is excluded is because it is considered less important for the user to check the brightness value of this region, compared with the high brightness region of which size is larger.

In operation S404, the display control unit 106 determines whether a number of detected high brightness regions is at least one. The display control unit 106 advances the processing to operation S405 if the number of detected high brightness regions is at least one. The processing of this flow chart ends if the number of detected high brightness regions is 0.

In the case where the operations of this flow chart are executed on the image 200 indicated in FIG. 2, the regions of the objects 201, 202, 204, 205 and 206 are detected as the high brightness regions, that is, the number of detected high brightness regions is 5. Therefore the display control unit 106 advances the processing from operation S404 to operation S405.

In operation S405, the display control unit 106 calculates the highest brightness value in each high brightness region in the image and coordinates (position) of the pixel having the highest brightness value (hereafter "highest brightness pixel"). Specifically, the display control unit 106 searches the brightness distribution for each high brightness region, calculates the highest brightness value among the brightness values of all the pixels in this high brightness region, and also calculates the coordinates of the pixel having the highest brightness value (highest brightness pixel).

In the case where a plurality of highest brightness pixels exist in the image, only an appropriate one thereof may be selected by the display control unit 106. For example, out of the plurality of pixels indicating the highest brightness value in the high brightness region, the display control unit 106 selects only a highest brightness pixel located at a position in a very specific direction (e.g. pixel of which coordinates are uppermost left in the image). As an alternative, the display control unit 106 may select only a highest brightness pixel closest to the center (center of gravity) of the high brightness region, out of the plurality of highest brightness pixels in the high brightness region.

In a region of each object indicated in FIG. 2, the brightness values of all the pixels within the region are the same. Therefore the display control unit 106 selects one pixel close to the center position of each region as the highest brightness pixel used for operation S406 and subsequent operations. This means that in the high brightness region of the object 201, the highest brightness value is 900 cd/$m^2$, and the coordinates of the highest brightness pixel are (400, 300). In the same manner, in the high brightness region of the object 202, the highest brightness value is 800 cd/$m^2$, and the coordinates of the highest brightness pixel are (1400, 250). In the high brightness region of the object 204, the highest brightness value is 210 cd/$m^2$ and the coordinates of the highest brightness pixel are (1600, 400). In the high brightness region of the object 205, the highest brightness value is 850 cd/$m^2$ and the coordinates of the maximum rightness pixel are (900, 600). In the high brightness region of the object 206, the highest brightness value is 700 cd/$m^2$ and the coordinates of the highest brightness pixel are (1200, 700).

FIG. 6 is a table indicating the highest brightness value of each high brightness region in FIG. 2 and coordinates of the highest brightness pixel thereof. As indicated in the table in FIG. 6, the brightness value of the highest brightness pixel at coordinates (400, 300) is 900 cd/$m^2$, and the brightness value of the highest brightness pixel at coordinates (1400, 250) is 800 cd/$m^2$. The brightness value of the highest brightness pixel at coordinates (1600, 400) is 210 cd/$m^2$, and the brightness value of the highest brightness pixel at coordinates (900, 600) is 850 cd/$m^2$. The brightness value of the highest brightness pixel at coordinates (1200, 700) is 700 cd/$m^2$.

Figure 5:
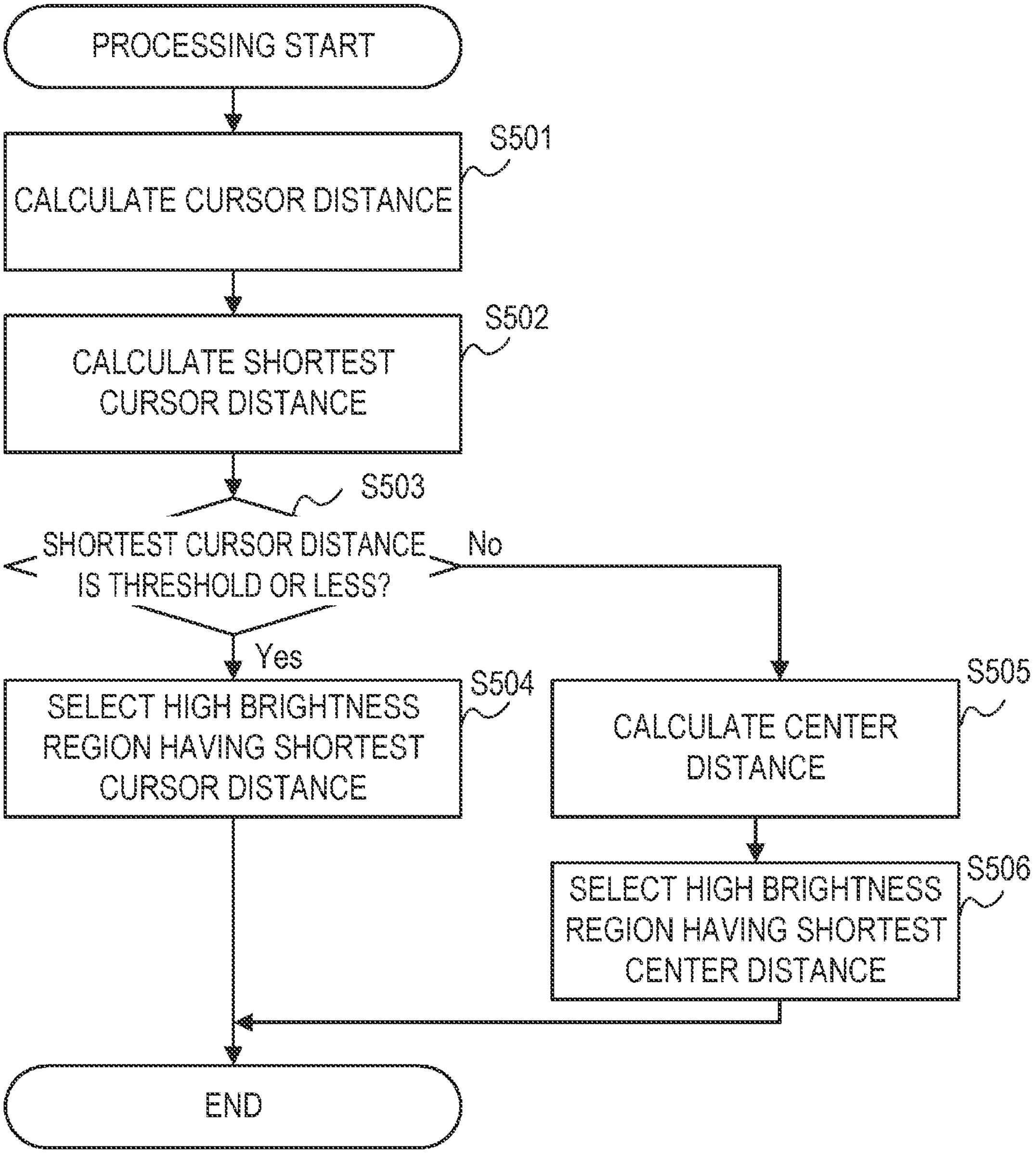
FIG. 5 is a flow chart of a region selecting processing according to Embodiment 1.

In operation S406, the display control unit 106 selects one high brightness region out of the high brightness regions in the image as a selected region. The processing to select the selected region (region selecting processing) will be described in detail later with reference to FIG. 5.

In operation S407, the display control unit 106 outputs information on the highest brightness value and information on the coordinates of the highest brightness pixel in the selected region, which was selected in operation S406, to the drawing unit 104.

When the drawing unit 104 acquires the information on the coordinates of the highest brightness pixel and the information on the highest brightness value from the display control unit 106, the drawing unit 104 moves the cursor so as to indicate the position of the highest brightness pixel, and draws the highest brightness value on the image. Then the drawing unit 104 outputs the image, generated after the drawing processing, to the display unit 105 as the display image. The display unit 105 display the display image acquired from the drawing unit 104. Thereby the display unit 105 can display the display image, generated by superimposing the cursor, which indicates the position of the highest brightness pixel of the selected region, and the brightness value of the highest brightness pixel, on the image.

Here when the information on the coordinates of the highest brightness pixel and the information on the highest brightness value are received from the display control unit 106, the drawing unit 104 may highlight the selected region including this highest brightness pixel, instead of moving the cursor to the coordinates of the highest brightness pixel. For example, the drawing unit 104 may indicate the position of the selected region to the user by drawing a frame surrounding the selected region. As an alternative, the drawing unit 104 may also draw a frame surrounding the selected region after moving the cursor first.

(Region Selecting Processing; Operation S406) The processing for selecting one selected region out of one or a plurality of high brightness regions in an image (region selecting processing) in operation S406 will be described with reference to the flow chart in FIG. 5.

In operation S501, the display control unit 106 acquires the coordinates (position) of the highest brightness pixel of each high brightness region (the coordinates of each high brightness region) and the coordinates (position) of the cursor (acquires position). Then the display control unit 106 calculates the distance between the highest brightness pixel of each high brightness region and the cursor (the distance between each high brightness region and the cursor). The distance here indicates a value when the length of one pixel in the horizontal direction or the vertical direction is one. FIG. 9A indicates a distance between the highest brightness pixel of each high brightness region and the cursor in a case where the cursor 701 is disposed at the coordinates (1500, 450), as indicated in the example in FIG. 7A. For example, the coordinates of the highest brightness pixel of the high brightness region of the object 202 are (1400, 250), hence the distance between the coordinates (1400, 250) and the coordinates of the cursor 701, that is (1500, 450), is a square root of the value of $(1500-1400)^2+(450-250)^2$. In other words, this distance is a square root of 50000, that is about 223.6068. In the same manner, FIG. 9B indicates the distance between each high brightness region and the cursor in the case where the cursor 702 is disposed at the coordinates (900, 100), as indicated in the example in FIG. 7B. In the following, the distance between the high brightness region and the cursor is called a "cursor distance".

In operation S502, the display control unit 106 calculates (determines) a cursor distance of which value is shortest (smallest) among the cursor distance values calculated in operation S501 (hereafter called "shortest cursor distance"). In the case where the cursor 701 is disposed at coordinates (1500, 450), as in the example indicated in FIG. 7A, the shortest cursor distance is 111.8034 (see FIG. 9A). This shortest cursor distance corresponds to the distance between the high brightness region, including the highest brightness pixel at coordinates (1600, 400) (high brightness region of object 204), and the cursor. On the other hand, in the case where the cursor 702 is disposed at coordinates (900, 100), as in the example indicated in FIG. 7B, the shortest cursor distance is 500 (see FIG. 9B). This shortest cursor distance corresponds to the distance between the high brightness region, including the highest brightness pixel at coordinates (900, 600) (high brightness region of object 205), and the cursor.

In operation S503, the display control unit 106 determines whether the shortest cursor distance is a threshold or less. Processing advances to operation S504 if the shortest cursor distance is the threshold or less. Processing advances to operation S505 if the shortest cursor distance is longer (larger) than the threshold.

Figure 7A:
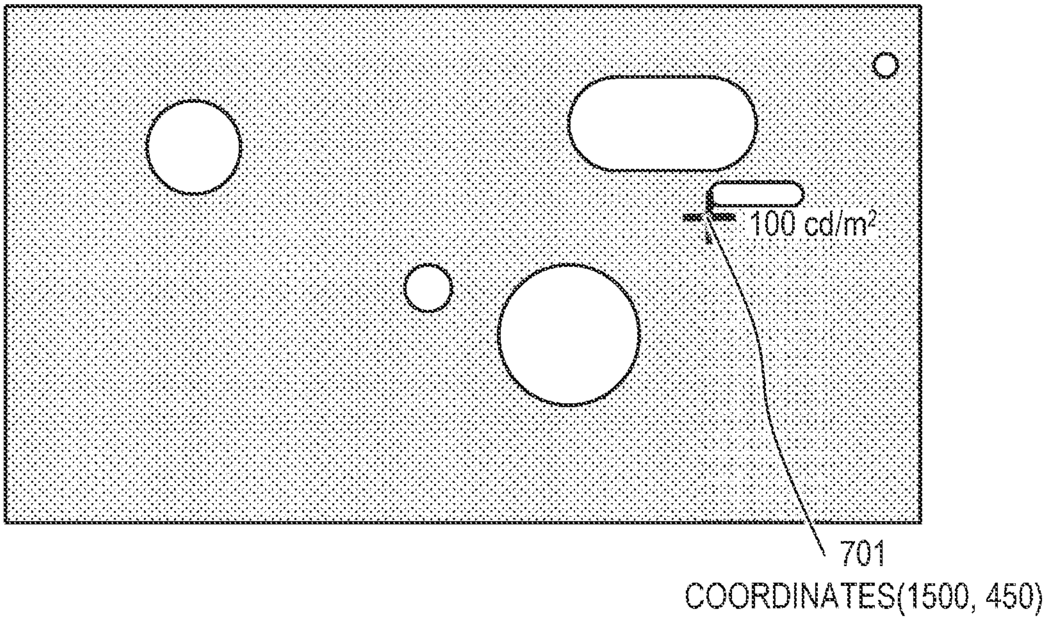
FIGS. 7A and 7B are diagrams indicating a position of a cursor according to Embodiment 1.
Figure 7B:
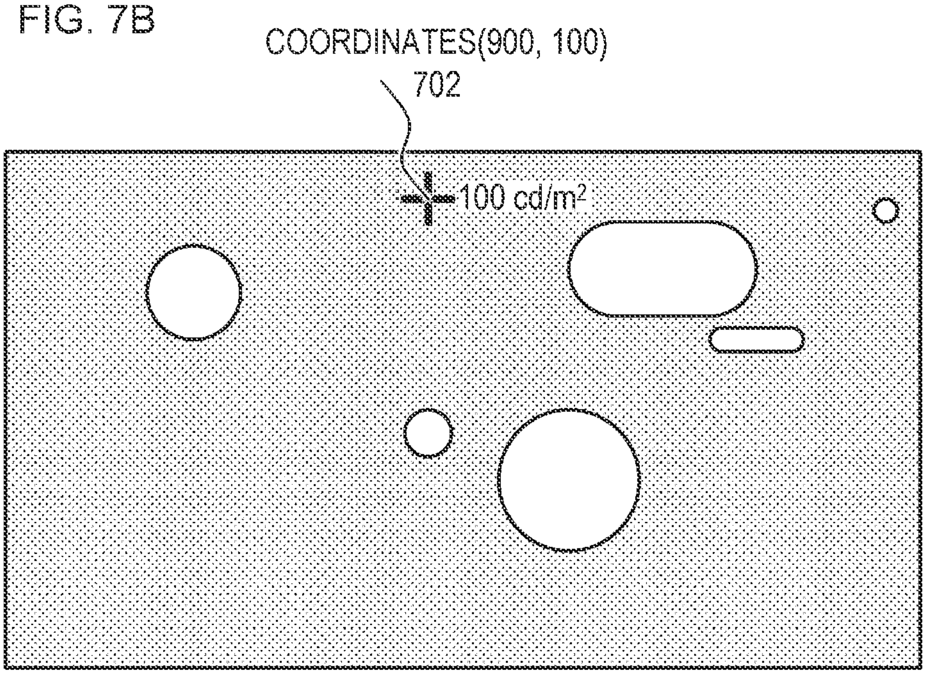

The threshold to determine whether the shortest cursor distance is long/short may be an arbitrary value, but is 300 in Embodiment 1. In the case where the threshold is set to 300 and the cursor 701 is disposed at coordinates (1500, 450), as indicated in FIG. 7A, the shortest cursor distance, which is 111.8034, is the threshold or less. Therefore processing advances to operation S504. On the other hand, in the case where the cursor 702 is disposed at coordinates (900, 100), as indicated in FIG. 7B, the shortest cursor distance, which is 500, is longer than the threshold. Therefore processing advances to operation S505.

In operation S504, using the cursor distance as an evaluation value, the display control unit 106 selects the high brightness region, including the coordinates having the shortest cursor distance, as the selected region. In the case where the cursor 701 is disposed at coordinates (1500, 450), as indicated in FIG. 7A, the display control unit 106 selects the high brightness region (high brightness region of object 204), which includes the coordinates (1600, 400) having the shortest cursor distance of 111.8034, as the selected region.

In operation S504, if there are a plurality of high brightness regions, including the coordinates having the shortest cursor distance, the display control unit 106 may select an arbitrary high brightness region out of these high brightness regions, as the selected region. As an alternative, the display control unit 106 may select a high brightness region of which distance between the center of the image and the highest brightness pixel of the high brightness region is the shortest (shortest distance) out of these high brightness regions, as the selected region.

In operation S505, the display control unit 106 calculates the distance between the center of the image and the highest brightness pixel of each high brightness region (the distance between the center of the image and each high brightness region). FIG. 10 indicates the distance between the center of the image 200 in FIG. 2 and the highest brightness pixel of each high brightness region. Hereafter the distance between the center of the image and the high brightness region is called "center distance".

In the image 200 in FIG. 2, there are 4 center coordinates: (959, 539), (959, 540), (960, 539) and (960, 540). The center coordinates may be any one of these 4 coordinates, or may be coordinates (959.5, 539.5) which are the average coordinates of these 4 coordinates. In Embodiment 1, the center coordinates of the image 200 are assumed to be (960, 540). Then the distance (center distance) between the coordinates (900, 600) of the highest brightness pixel of the object 205 and the center coordinates (960, 540) is a square root of the value of $(960-900)^2+(540-600)^2=7200$, that is, 84.85281.

In operation S506, the display control unit 106 uses the center distance as the evaluation value, and selects a high brightness region, which includes the coordinates having the shortest value of the calculated center distances of a plurality of high brightness regions (hereafter "shortest center distance"), as the selected region. In the case where the cursor 702 is disposed at the coordinates (900, 100), as indicated in FIG. 7B, the display control unit 106 selects the high brightness region (high brightness region of the object 205), which includes the coordinates (900, 600) having the center distance of 84.85281, as the selected region.

In operation S506, if there are a plurality of high brightness regions, which includes the coordinates having the shortest center distance, the display control unit 106 may select an arbitrary high brightness region out of these high brightness regions, as the selected region. As an alternative, the display control unit 106 may select a high brightness region of which distance between the cursor and the highest brightness pixel of the high brightness region is the shortest (shortest distance), out of these high brightness regions, as the selected region.

Figure 8A:
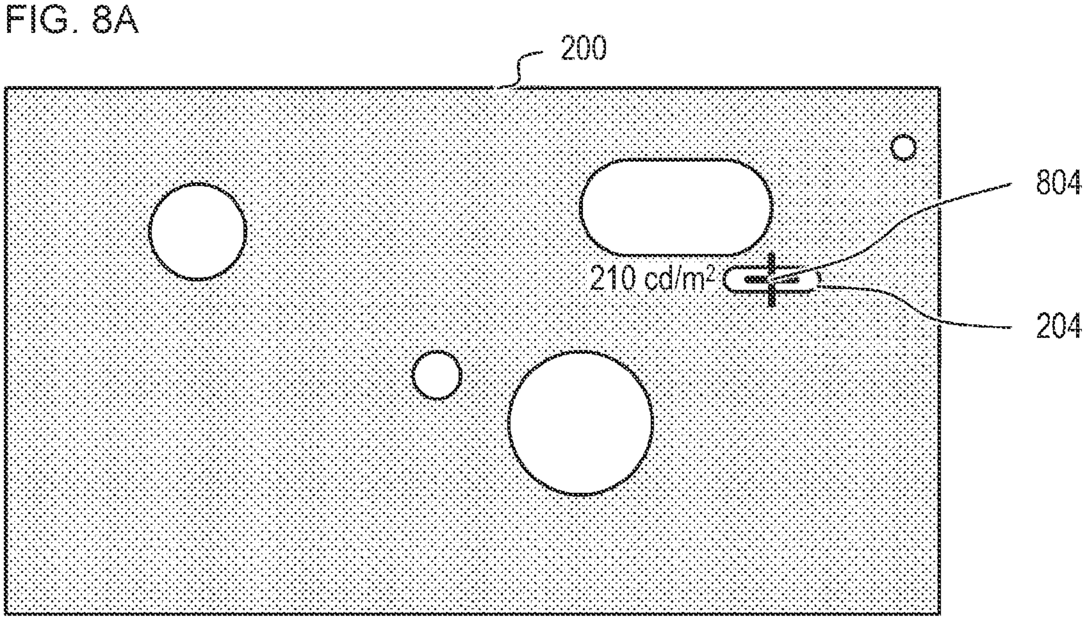
FIGS. 8A and 8B are diagrams indicating an image after the drawing pixel determining processing according to Embodiment 1.
Figure 8B:
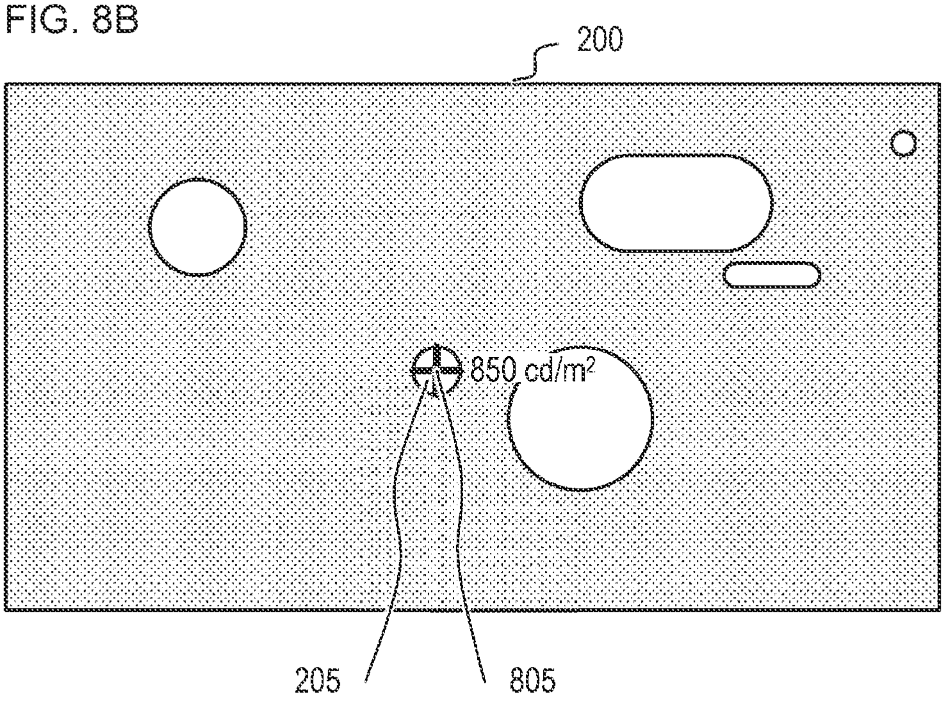

FIGS. 8A and 8B indicate display examples of the image 200 displayed on the display unit 105 after the drawing pixel determining processing (see FIG. 4) is executed. The cursor and the brightness value are displayed on the image 200.

When the drawing pixel determining processing is executed in a state where the cursor 701 is disposed at the coordinates (1500, 450), as indicated in FIG. 7A, the high brightness region, which includes the coordinates (1600, 400) (the high brightness region of object 204) is selected. Therefore, as indicated in FIG. 8A, the cursor 804 that indicates the position of the high brightness region (highest brightness pixel) of the object 204, and the highest brightness value of the high brightness region of the object 204, are newly displayed.

When the drawing pixel determining processing is executed in a state where the cursor 702 is disposed at the coordinates (900, 100), as indicated in FIG. 7B, the high brightness region, which includes the coordinates (900, 600) (high brightness region of the object 205), is selected. Therefore, as indicated in FIG. 8B, the cursor that indicates the position of the high brightness region (highest brightness pixel) of the object 205, and the highest brightness value of the high brightness region of the object 205, are newly displayed.

According to Embodiment 1, when one high brightness region is selected out of a plurality of high brightness regions (feature regions), a more preferable high brightness region can be selected by considering the distance between the display item and each high brightness region, as described above.

In Embodiment 1, if the high brightness regions are disposed near the cursor, the display control unit 106 selects a high brightness region, which includes the coordinates having the shortest cursor distance (that is, selects a high brightness region closest to the cursor). Thereby after the user manually moves the cursor close to a high brightness region, this cursor can be accurately moved to the coordinates of the high brightness region. Further, in a case where a cursor is positioned at a high brightness region in advance in a moving image, and the image changes and the high brightness region slightly moves, the cursor can be accurately moved back to the coordinates of the high brightness region.

In a case here high brightness regions are not disposed near the cursor, on the other hand, the display control unit 106 selects a high brightness region, which includes the coordinates having the shortest center distance (that is, selects a high brightness region closest to the center of the image). Thereby the cursor can be moved to a high brightness region close to the center of the image where the probability of a major subject being located is relatively high. If the processing, to move the cursor to a high brightness region near the cursor, were performed in such a case, the cursor may have moved to a position unintended by the user because the high brightness region to which the cursor is moved and the position of the cursor before moving the cursor are distant. If the cursor is moved to a high brightness region near the center of the image, on the other hand, the cursor moves to a position where the probability of a major subject being located is relatively high, hence the possibility of the above mentioned problem can be reduced. In the case where high brightness regions are not disposed near the cursor, any method may be used, as long as a high brightness region, where the probability of a major subject being located is relatively high, can be selected. This means that a largest sized high brightness region, among high brightness regions of a specific object (e.g. a person), for example, may be selected.

In Embodiment 1, when the high brightness regions are detected, the display control unit 106 classifies a pixel indicating a brightness value, which is higher than a threshold that is set for the brightness threshold of the high brightness region, as a high brightness pixel, but the disclosure is not limited thereto. For example, the display control unit 106 may classify only a pixel having the highest brightness included in the image, as a high brightness pixel. Further, the display control unit 106 may classify a pixel, of which brightness value is at least 90% of the highest brightness value, as a high brightness pixel.

In Embodiment 1, in operation S403, the display control unit 106 removes a high brightness region of which size is less than the size threshold from the high brightness regions. The processing in operation S403, however, may be omitted.

In the description of Embodiment 1, the highest brightness pixel, out of the pixels in a high brightness region, was used, but instead of the highest brightness pixel, a pixel of which brightness value is lowest (lowest brightness pixel) in the high brightness region may be used. Further, instead of the highest brightness pixel, a pixel closest to the center of the high brightness region may be used, or a pixel closest to the cursor in the high brightness region may be used. In other words, an arbitrary pixel may be used instead of the highest brightness pixel. This aspect is the same for the embodiments other than Embodiment 1. Therefore the distance between the highest brightness pixel of the high brightness region and the cursor described above may be a distance between the center of the high brightness region and the cursor, or a distance between the pixel closest to the cursor in the high brightness region and the cursor, for example, as long as the distance is the distance between the high brightness region and the cursor.

Embodiment 2

A display control device 100 according to Embodiment 2 will be described. In Embodiment 2, the display control device 100 selects one high brightness region out of a plurality of high brightness regions, further considering the sizes of the high brightness regions (feature regions). Then the display control device 100 displays a position on a pixel of the selected high brightness region and the brightness value of this pixel. In the following description, a composing element the same as Embodiment 1 is denoted with a same reference sign, and detailed description thereof will be omitted.

Figure 11:
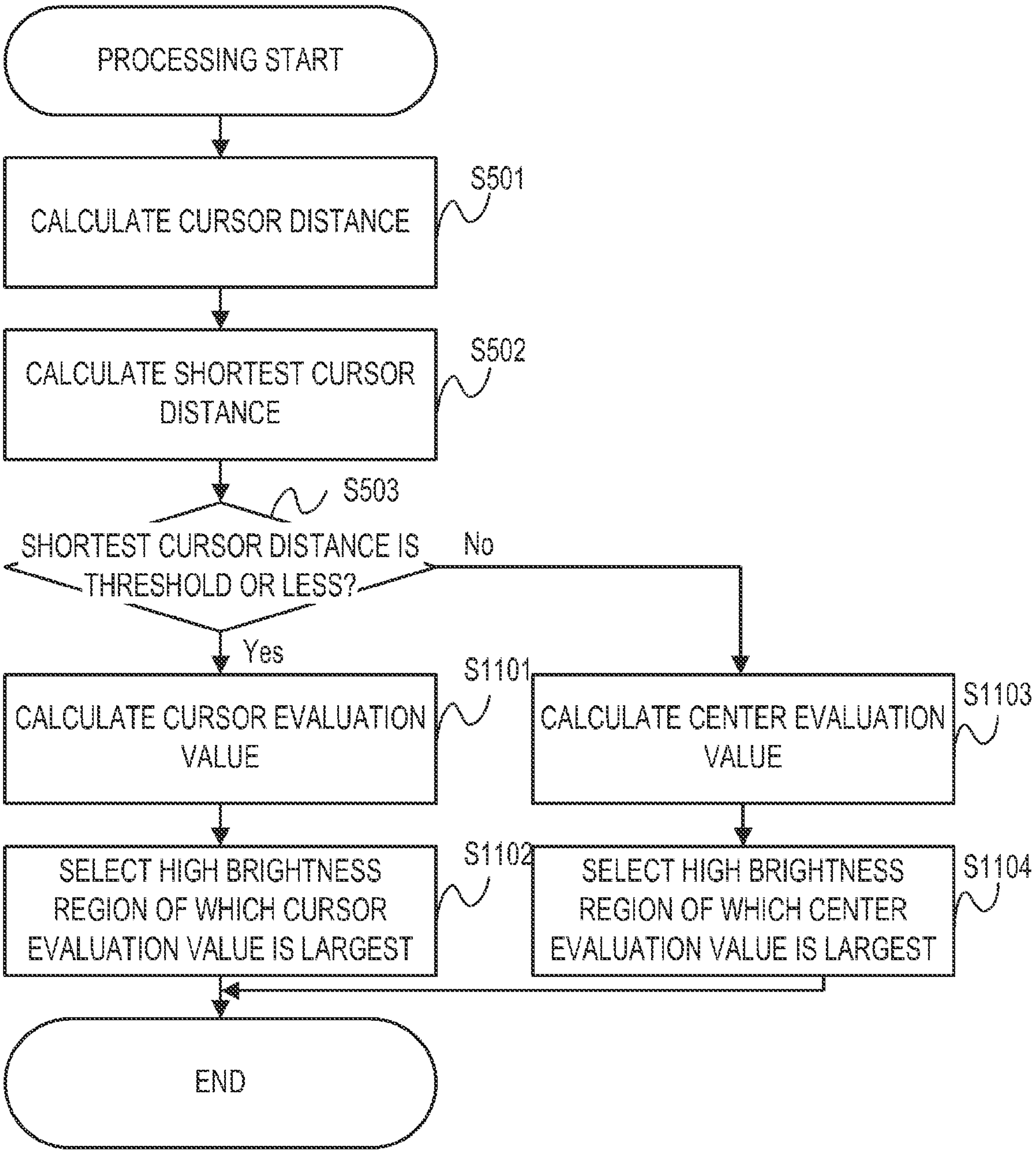
FIG. 11 is a flow chart of region selecting processing according to Embodiment 2.

In Embodiment 2, the region selecting processing in the flow chart in FIG. 11 is executed instead of the region selecting processing (FIG. 5) according to Embodiment 1. In other words, in Embodiment 2, the operations S1101 and S1102 are executed instead of operation S504, and the operations S1103 and S1104 are executed instead of operations S505 and S506.

In operation S1101, the display control unit 106 calculates a size and a "cursor evaluation value" of each high brightness region. The cursor evaluation value here in Embodiment 2 is a value determined by dividing the size of a high brightness region by a distance between this high brightness region and the cursor. The cursor evaluation value, however, is not limited thereto, as long as the value is a value determined considering the distance between the high brightness region and the cursor, and is a value indicating the desirability of each high brightness region as a selected region. For example, the cursor evaluation value may be a total of a number determined by dividing a predetermined number (e.g. 10000000) by a distance between the high brightness region and the cursor and the size of this high brightness region.

FIG. 12 indicates the coordinates of a highest brightness pixel, a brightness value of the highest brightness pixel, a cursor distance, a size, and a cursor evaluation value of each high brightness region in a case where the cursor 701 is disposed at the coordinates (1500, 450), as indicated in the example in FIG. 7A.

In operation S1102, the display control unit 106 selects a high brightness region, which includes coordinates having a maximum value of the cursor evaluation value, as a selected region. As indicated in FIG. 12, if the cursor evaluation value has been calculated, the display control unit 106 selects a high brightness region, which includes the coordinates (1400, 250) having the maximum value of the cursor evaluation value of 491.934955, as the selected region.

In operation S1103, the display control unit 106 calculates a "center evaluation value" of each high brightness region. The center evaluation value here in Embodiment 2 is a value determined by dividing a size of a high brightness region by a distance between this high brightness region and the center of the image. The center evaluation value, however, is not limited thereto, as long as the value is a value determined considering the distance between the high brightness region and the center of the image, and is a value indicating the desirability of each high brightness region as a selected region. For example, the center evaluation value may be the total of a number determined by dividing a predetermined number (e.g. 10000000) by a distance between the high brightness region and the center of the image and the size of this high brightness region.

FIG. 13 indicates the coordinates of the highest brightness pixel, a brightness value of the highest brightness pixel, a center distance, a size and a center evaluation value, of each high brightness region in the image 200 indicated in FIG. 2.

In operation S1104, the display control unit 106 selects a high brightness region, which includes coordinates having a maximum value of the center evaluation value, as the selected region. As indicated in FIG. 13, if the center evaluation value has been calculated, the display control unit 106 selects a high brightness region, which includes the coordinates (1200, 700) having the maximum value of the center evaluation value (that is, 277.3500981), as the selected region.

Figure 14A:
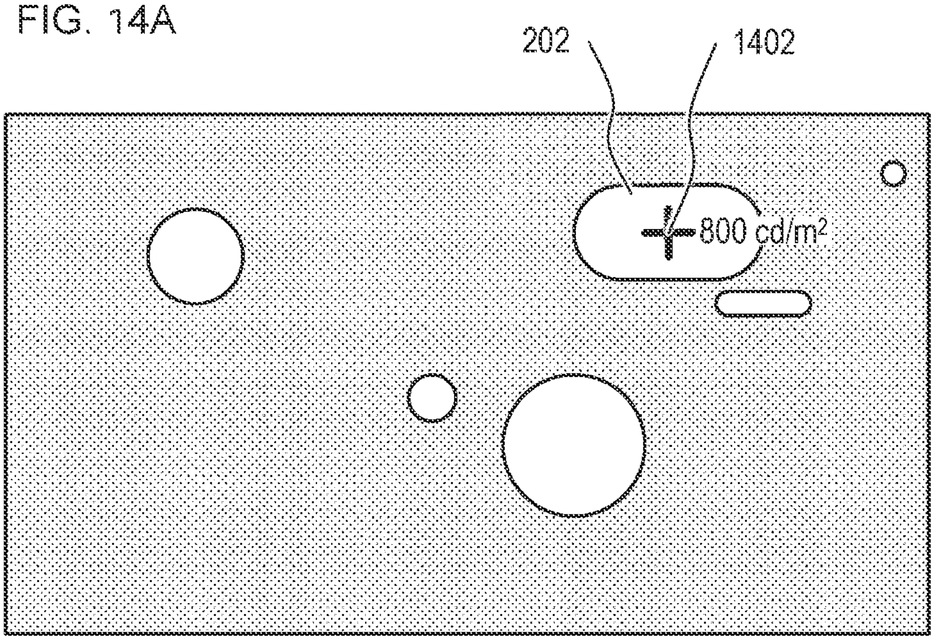
FIGS. 14A and 14B are diagrams indicating an image after drawing pixel determining processing according to Embodiment 2.
Figure 14B:
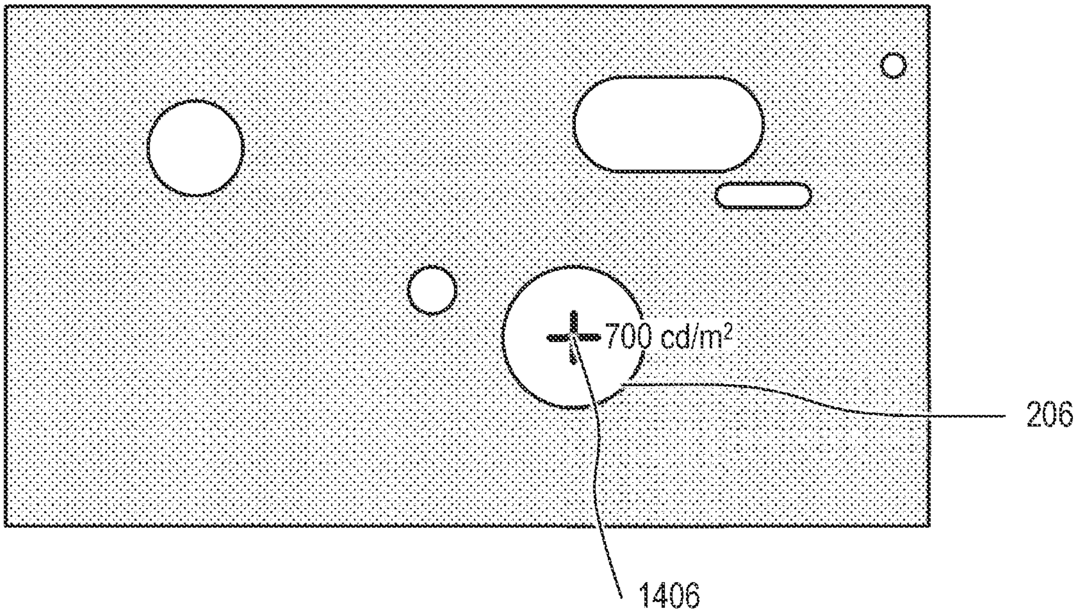

FIGS. 14A and 14B indicate display examples of the image 200 displayed on the display unit 105 after the drawing pixel determining processing (see FIG. 4), including the operations in the flow chart in FIG. 11, is executed.

When the drawing pixel determining processing is executed in a state where the cursor 701 is disposed at the coordinates (1500, 450), as indicated in the example in FIG. 7A, the high brightness region, which includes the highest brightness pixel at the coordinates (1400, 250) (that is, the high brightness region of object 202), is selected as the selected region. As indicated in FIG. 14A, the cursor 1402 which indicates the highest brightness pixel of the high brightness region of the object 202, and the brightness value of the highest brightness pixel (highest brightness value thereof), are newly displayed.

When the drawing pixel determining processing is executed in a state where the cursor 702 is disposed at the coordinates (900, 100), as indicated in the example in FIG. 7B, the high brightness region, which includes the highest brightness pixel at the coordinates (1200, 700) (that is, the high brightness region of object 206), is selected as the selected region. Therefore, as indicated in FIG. 14B, the cursor 1406 that indicates the highest brightness pixel of the high brightness region of the object 206, and the brightness of the highest brightness pixel (highest brightness value) thereof, are newly displayed.

According to Embodiment 2, when one high brightness region is selected out of a plurality of high brightness regions (feature regions), a more preferable high brightness region can be selected by considering the size of the feature region.

Compared with a high brightness region (feature region) of which size is small, the high brightness region of which size is large has a relatively high probability of playing a major role to express the image. Therefore by considering the size as in Embodiment 2, a high brightness region (feature region), of which size is large and has a probability of playing a major role to express the image is relatively high, can be selected with priority (that is, the position of the cursor is changed thereto).

Embodiment 3

A display control device 100 according to Embodiment 3 will be described. In Embodiment 3, the display control device 100 sequentially changes a high brightness region selected out of a plurality of high brightness regions (feature regions), as a selected region. Specifically, every time the user instructs to execute the automatic determination operation, the display control device 100 sequentially changes a high brightness region to be selected as the selected region in order of a first high brightness region (first feature region), a second high brightness region, a third high brightness region and the like. Then the display control device 100 displays the position and the highest brightness value of the highest brightness pixel in the selected region. In the following description, a composing element the same as Embodiment 1 or 2 is denoted with a same reference sign, and detailed description thereof will be omitted.

Figure 4:
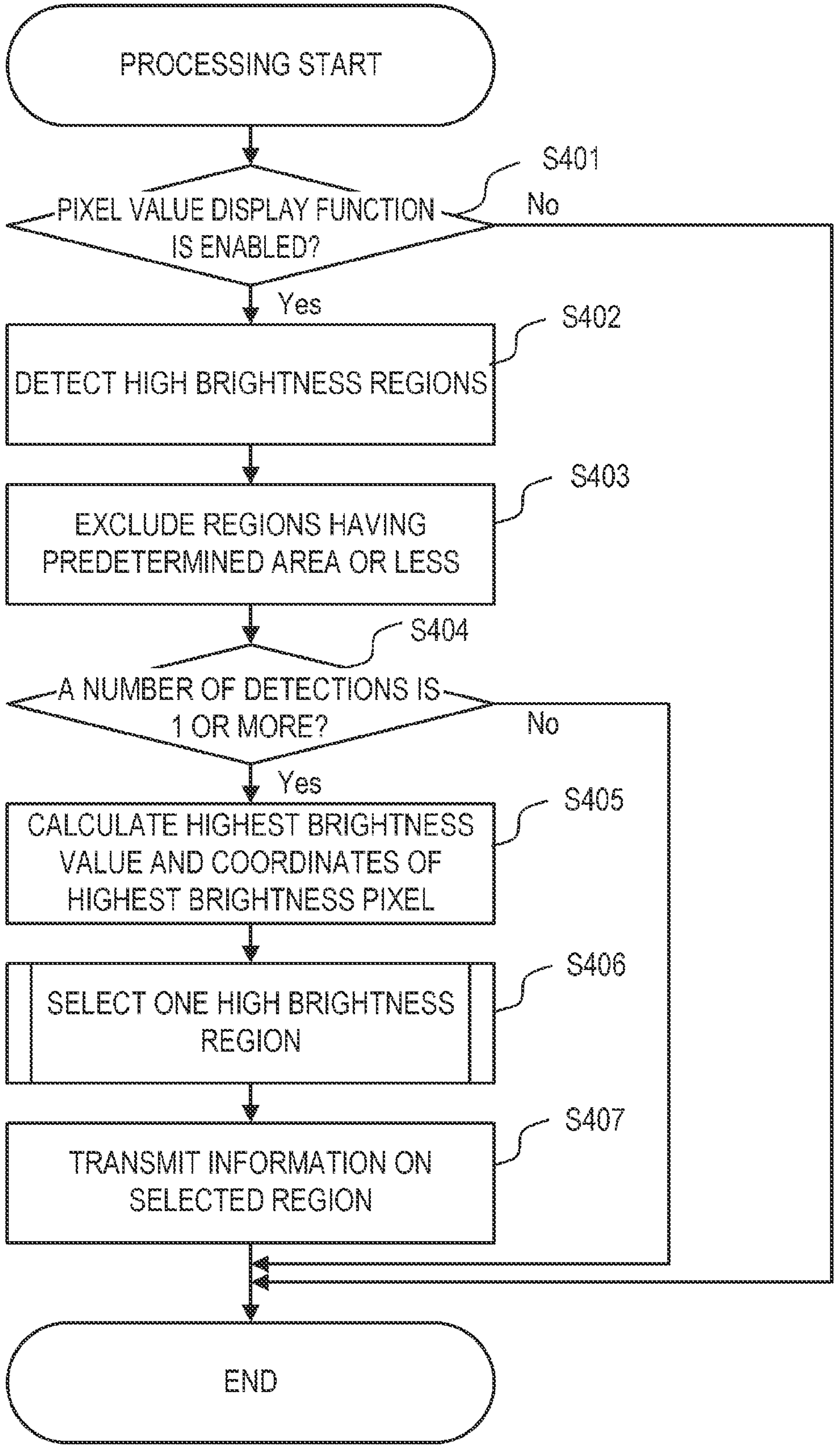
FIG. 4 is a flow chart of drawing pixel determining processing according to Embodiment 1.
Figure 15:
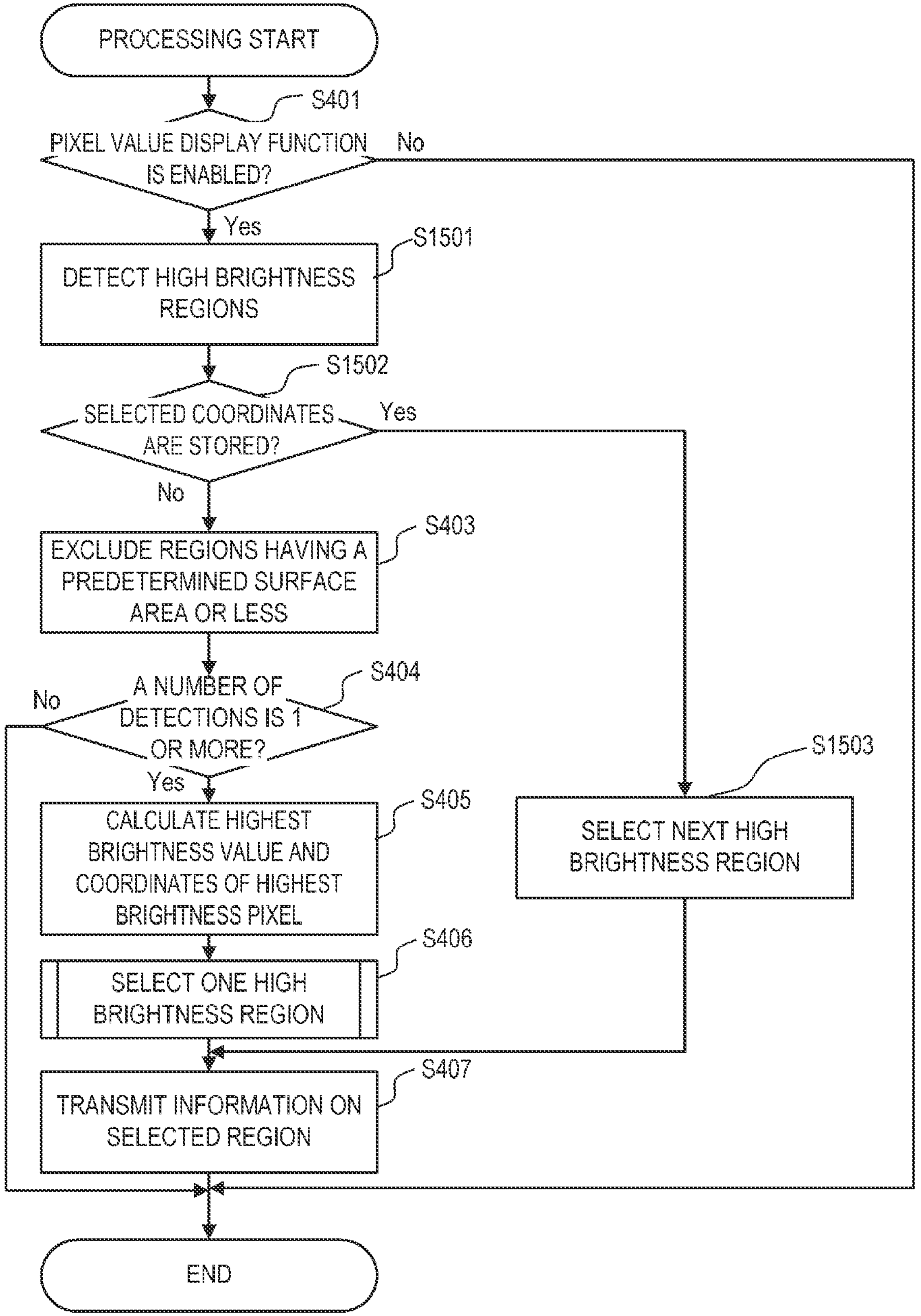
FIG. 15 is a flow chart of drawing pixel determining processing according to Embodiment 3.

In the drawing pixel determining processing in Embodiment 3, operations of a flow chart in FIG. 15 are executed instead of the flow chart in FIG. 4. In other words, the processing in operation S1501 is executed when it is determined that the pixel value display function is enabled in operation S401.

In operation S1501, the display control unit 106 detects high brightness regions just like operation S402. In a case where three coordinates of the high brightness regions in the past (first selected coordinates to third selected coordinates) are stored in the storage unit 107, the display control unit 106 deletes the three coordinates from the storage unit 107 unless any one of the three coordinates is included in the detected high brightness regions.

In operation S1502, the display control unit 106 determines whether the three selected coordinates (first selected coordinates to third selected coordinates) are stored in the storage unit 107. Processing advances to operation S1503 if the first selected coordinates to the third selected coordinates are stored in the storage unit 107. Processing advances to operation S403 if the first selected coordinates to the third selected coordinates are not stored in the storage unit 107.

In operation S1503, the display control unit 106 selects a high brightness region next to the high brightness region currently indicated by the cursor, as the selected region. In other words, if the cursor currently indicates a high brightness region that exists at the first selected coordinates (first high brightness region), the display control unit 106 selects a high brightness region that exists at the second selected coordinates (second high brightness region) as the selected region. If the cursor currently indicates the second high brightness region, the display control unit 106 selects a high brightness region that exists at the third selected coordinates (third high brightness region) as the selected region. Further, if the cursor currently indicates the third high brightness region, the display control unit 106 selects the first high brightness region as the selected region. In the case where the cursor does not indicate any one of the first to third high brightness regions, the display control unit 106 selects the first high brightness region as the selected region.

In Embodiment 3, only the operations S504 and S506 of the region selecting processing (operation S406) are different (see flow chart in FIG. 5), hence only these two operations will be described in detail.

In operation S504, the display control unit 106 selects the high brightness region corresponding to the shortest cursor distance as the selected region. Further, the display control unit 106 selects three high brightness regions in order from the shorter (smaller) cursor distance, and stores the coordinates of the highest brightness pixels of the three high brightness regions in the storage unit 107. Specifically, in the storage unit 107, the display control unit 106 stores the coordinates having the shortest cursor distance as the first selected coordinates, the coordinates having the second shortest cursor distance as the second selected coordinates, and the coordinates having the third shortest cursor distance as the third selected coordinates.

In step S506, the display control unit 106 selects a high brightness region corresponding to a shortest center distance, as the selected region. Further, the display control unit 106 selects three high brightness regions in order from the shorter center distance, and stores the coordinates of the highest brightness pixels of the three high brightness regions in the storage unit 107. Specifically, in the storage unit 107, the display control unit 106 stores the coordinates having the shortest center distance as the first selected coordinates, the coordinates having the second shortest center distance as the second selected coordinates, and the coordinates having the third shortest center distance as the third selected coordinates.

When the user instructs to execute the automatic determination operation like this, the display control unit 106 selects a selected region in the same manner as Embodiment 1 if the three selected coordinates are not stored in the storage unit 107. If the three selected coordinates are stored in the storage unit 107, on the other hand, every time the automatic determination operation is performed, the display control unit 106 sequentially changes a high brightness region to be selected as the selected region in the order of a first high brightness region, a second high brightness region and a third high brightness region. As an alternative, every time the automatic determination operation is executed, the display control unit 106 may sequentially change a high brightness region to be selected as the selected region in the order of the third high brightness region, the second high brightness region and the first high brightness region.

Instead of the three high brightness regions of the first to third high brightness regions, an arbitrary number N (N≥2) of high brightness regions may be sequentially changed. In other words, the display control unit 106 may store coordinates of the N number of high brightness regions in the storage unit 107 in advance, so as to change to a high brightness region to be selected as the selected region, every time the automatic determination operation is executed.

According to Embodiment 3, a preferable high brightness region can be sequentially selected out of a plurality of high brightness regions (feature regions) by considering the distance between the display item and the feature region, and the distance between the center of the image and the feature region.

Embodiment 4

A display control device 100 according to Embodiment 4 will be described. In Embodiment 4, the display control device 100 selects high brightness regions (feature regions) from a region which does not include an on-screen display (OSD) region. In the following description, a composing element the same as Embodiment 1, 2 or 3 is denoted with a same reference sign, and detailed description thereof will be omitted.

Figure 18:
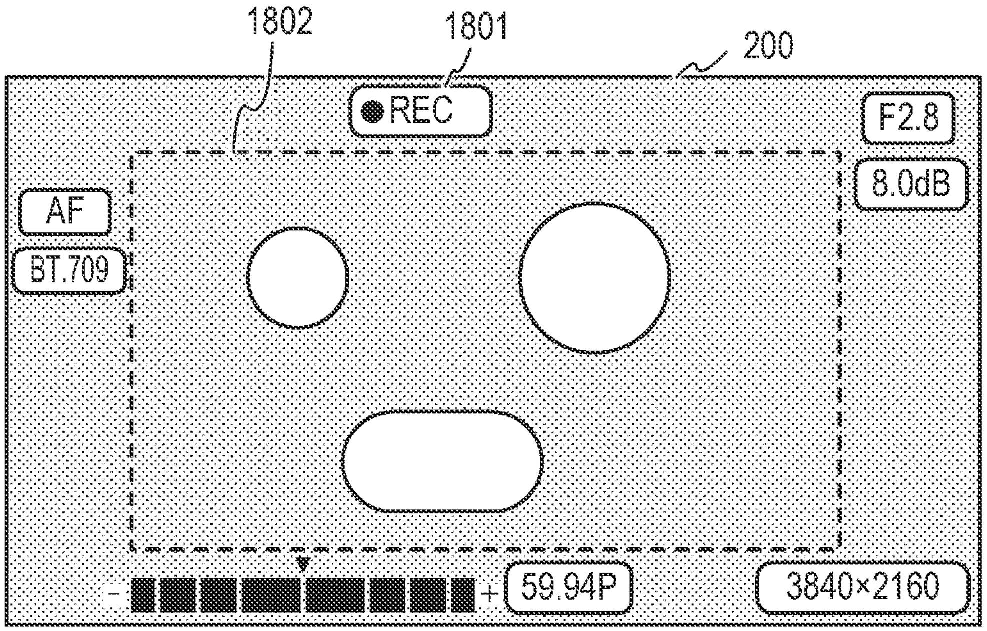
FIG. 18 is a diagram indicating an OSD image superimposed on an image.

FIG. 18 is a diagram for describing an OSD image superimposed on an image 200. An external device (image transmission apparatus) connected to the image acquiring unit 101, in some cases, may superimpose information indicating a state of the device and the like (e.g. text, graphics) on an image, in order to notify the information to the user operating the device. For example, in the case where an external device (e.g. imaging device) starts recording and notifies the user of the recording state, the external device superimposes such an OSD image as an image 1801 in FIG. 18 on the image 200. In this example, the outside of the broken line 1802 of the image 200 indicated in FIG. 18 is the OSD region (region where an OSD image may be (may possibly be) superimposed). The OSD image is superimposed to support operation of the external device. Therefore the user who wants to check the feature regions of the image normally desires to remove the OSD region (region where these OSD images are superimposed) from the targets of checking the feature regions.

Figure 17:
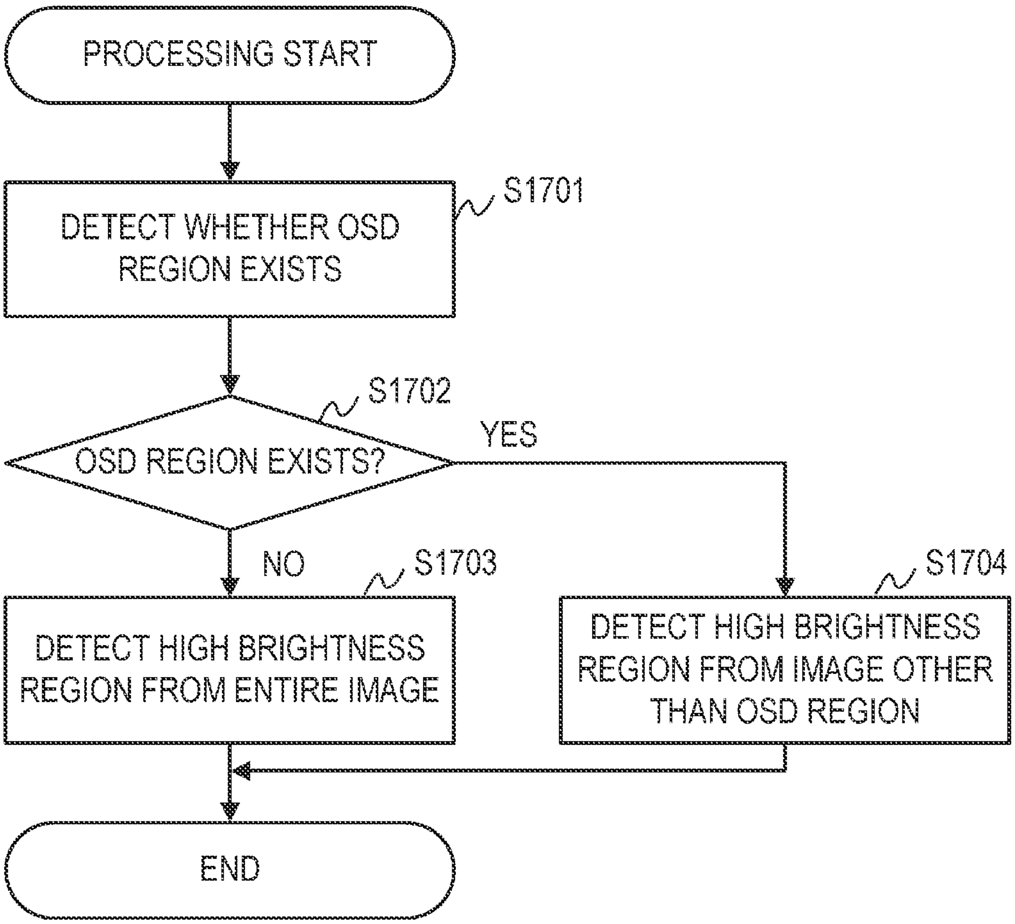
FIG. 17 is a flow chart of a region selecting processing according to Embodiment 4.

In the case of selecting a high brightness region according to Embodiment 4, the processing operations in the flow chart in FIG. 17 are executed. The processing operations of this flow chart correspond to the processing operation S402 in FIG. 4 or to the processing operation S1501 in FIG. 15. Therefore by replacing the processing operation in S402 or the processing operation S1501 with the processing operations of the following flow chart, the selection of high brightness regions according to each embodiment can be performed in a region of the image 200 excluding the OSD region.

In operation S1701, the display control unit 106 detects whether or not the OSD region exists in the image 200. For example, in the case where the output terminal of the image transmission apparatus connected to the image acquiring unit 101 is an output terminal for monitoring according to the information on the output terminal, the display control unit 106 detects a predetermined range as the OSD region. In other cases, the display control unit 106 determines that the OSD region does not exist in the image 200. Here it is assumed that the image transmission apparatus (e.g. imaging device) includes an output terminal for recording to be connected to a device for recording images, and an output terminal for monitoring to check the state of the image during operation. It is also assumed that the type information on the output terminal is transmitted from the output terminal for monitoring in the form of additional information (e.g. InfoFrame of HDMI, Ancillary data packet of SDI). In the case where the type information cannot be acquired, the display control unit 106 assumes that the output terminal is not the output terminal for monitoring.

In operation S1702, the display control unit 106 determines whether or not the OSD region is included in the image 200. In operation S1701, it is determined that the OSD region is included in the image 200 if the OSD region is detected, and processing advances to operation S1703. In operation S1701, it is determined that the OSD region is not included in the image 200 if the OSD region is not detected, and processing advances to operation S1704.

In operation S1703, the OSD region does not exist in the image 200, hence the display control unit 106 performs processing the same as operation S402 or operation S1501.

In operation S1704, the display control unit 106 extracts the OSD region from the image 200. Then the display control unit 106 detects (extracts) one or a plurality of high brightness regions from the range (region) in the image 200, excluding the OSD region. Here between operation S402 and operation S1501, the classifying processing of the region performed on the brightness distribution acquired from the brightness information acquiring unit 102 is different. In operation S1704, the display control unit 106 classifies the OSD region (all the coordinates included in the OSD region) as a low brightness region, regardless the brightness values thereof (classifies the OSD region as a high brightness region in the case where low brightness regions are selected as the feature regions). The OSD region in Embodiment 4 is in a range of the image 200 in FIG. 18 outside the broken line 1802, which is a predetermined range on the outer edge portion of the image 200. For the range (coordinates) not included in the OSD region, processing (the classifying processing) the same as operation S402 or operation S1501 is performed.

According to Embodiment 4, a preferable high brightness region (feature region) can be selected by selecting the high brightness region from a region not including the OSD region.

In the description in Embodiment 4, the OSD region is detected in operation S1701 based on the information on the output terminal of the image transmission apparatus. The display control unit 106, however, may acquire at least one of the information on whether or not an OSD exist and the information on the position where the OSD is superimposed (superimposed position of the OSD) from the image transmission apparatus via network communication, and detect an OSD region based on the acquired information. Further, the display control unit 106 may acquire at least one of the information on whether or not the OSD exists and information on the position where the OSD is superimposed (superimposed position of the OSD) from additional information attached to the image 200 (image signal; image information), and detect the OSD region based on the acquired information. In these cases, the display control unit 106 may detect the superimposed position of the OSD as the OSD region. Further, in Embodiment 4, all the regions on which the OSD image is superimposed are regarded as OSD regions, but in the case where the information on the position where the OSD is superimposed can be explicitly acquired, only the region where the OSD image is currently superimposed may be determined as an OSD region. Furthermore, the display control unit 106 may determine that the OSD region exists in the case where objects (e.g. text, graphics) that can be detected by machining learning or the like is included in the image 200, or may detect the regions of the objects as OSD regions.

Whereas the disclosure has been described in detail based on preferred embodiments thereof, the disclosure is not limited to these specified embodiments, and various other modes within the scope of not departing from the spirit of the disclosure are also included in the disclosure. Parts of the above embodiments may be combined as required.

For example, in the above description, the display control device executes a series of processing operations to display the brightness value on the image, but a part of the processing operations executed by the display control device may be executed by another device. For example, the processing operations of calculating a brightness value, generating the cursor to indicate a position of a pixel, and combining this information with an image, may be performed by a standalone PC, and the display control device may display the display image outputted by the PC.

According to the disclosure, a preferable feature region can be selected in an image having a plurality of feature regions.

In the above description, "processing advances to operation S1 if A is B or more, and advances to operation S2 if A is smaller (lower) than B" may be interpreted as "processing advances to operation S1 if A is larger (higher) than B, and advances to operation S2 if A is B or less". Conversely, "processing advances to operation S1 if A is larger (higher) than B, and advances to operation S2 if A is B or less" may be interpreted as "processing advances to operation S1 if A is B or more, and advances to operation S2 if A is smaller (lower) than B". This means that "A or more" may be interpreted as "larger (higher; longer; more) than A", and "A or less" may be interpreted as "smaller (lower; shorter; less) than A", as long as no inconsistencies occur. Further, "larger (higher; longer; more) than A" may be interpreted as "A or more" and "smaller (lower; shorter; less) than A" may be interpreted as "A or less".

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-012007, filed on Jan. 28, 2022 and Japanese Patent Application No. 2022-179042, filed on Nov. 8, 2022, which are hereby incorporated by reference herein in their entirety.

What is claimed is:

1. An electronic apparatus comprising at least one memory and at least one processor which function as:

an acquiring unit configured to acquire an image;

a position acquiring unit configured to acquire a position of an indicator which is displayed at a currently selected position in the acquired image; and a control unit configured to select one of a plurality of high brightness regions in the acquired image based on a distance between each of the plurality of high brightness regions and the indicator in a case where the acquired image includes the plurality of high brightness regions, wherein each of the plurality of high brightness regions is a region consisting of a plurality of pixels of the acquired image of which brightness values are higher than a first brightness value.

2. The electronic apparatus according to claim 1, wherein the control unit moves the indicator to a position of the selected high brightness region.

3. The electronic apparatus according to claim 1, wherein the control unit controls a display to display a brightness value of the selected high brightness region.

4. The electronic apparatus according to claim 1, wherein the control unit determines a shortest distance between each of the plurality of high brightness regions and the indicator, in a first case where the shortest distance is shorter than a predetermined distance, the control unit selects one of the plurality of high brightness regions based on a first evaluation value of each of the plurality of high brightness regions, and in a second case where the shortest distance is longer than the predetermined distance, the control unit selects one of the plurality of high brightness regions based on a second evaluation value of each of the plurality of high brightness regions.

5. The electronic apparatus according to claim 4, wherein the first evaluation value of the high brightness region is a distance between the high brightness region and the indicator, and in the first case, the control unit selects a high brightness region of which the first evaluation value is smallest out of the plurality of high brightness regions.

6. The electronic apparatus according to claim 4, wherein the first evaluation value of the high brightness region is a value based on a distance between the high brightness region and the indicator, and a size of the high brightness region.

7. The electronic apparatus according to claim 6, wherein the first evaluation value of the high brightness region is a value determined by dividing the size of the high brightness region by the distance between the high brightness region and the indicator, and in the first case, the control unit selects a high brightness region of which the first evaluation value is largest out of the plurality of high brightness regions.

8. The electronic apparatus according to claim 4, wherein the second evaluation value of the high brightness region is a distance between the high brightness region and a center of the image, and in the second case, the control unit selects a high brightness region of which the second evaluation value is smallest out of the plurality of high brightness regions.

9. The electronic apparatus according to claim 4, wherein the second evaluation value of the high brightness region is a value based on a distance between the high brightness region and a center of the image, and a size of the high brightness region.

10. The electronic apparatus according to claim 1, wherein the control unit selects N number of high brightness regions (N≥2) based on the distance between each of the plurality of high brightness regions and the indicator, and changes a high brightness region to be selected as one of the plurality of high brightness regions sequentially among the N number of high brightness regions, each time a predetermined operation is performed.

11. The electronic apparatus according to claim 10, wherein the control unit determines a shortest distance between each of the plurality of high brightness regions and the indicator, in a first case, where the shortest distance is shorter than a predetermined distance, the control unit selects the N number of high brightness regions based on a first evaluation value of each of the plurality of high brightness regions, and in a second case, where the shortest distance is longer than the predetermined distance, the control unit selects the N number of high brightness regions based on a second evaluation value of each of the plurality of high brightness regions.

12. The electronic apparatus according to claim 11, wherein the first evaluation value of the high brightness region is a distance between the high brightness region and the indicator, and in the first case, the control unit selects the N number of high brightness regions out of the plurality of high brightness regions in an ascending order of the first evaluation value.

13. The electronic apparatus according to claim 11, wherein the second evaluation value of the high brightness region is a distance between the high brightness region and a center of the image, and in the second case, the control unit selects the N number of high brightness regions out of the plurality of high brightness regions in an ascending order of the second evaluation value.

14. The electronic apparatus according to claim 1, wherein the at least one memory and the at least one processor further function as a region detecting unit configured to detect, as a first region, a region of the image on which an on-screen display (OSD) image is superimposed or a region of the image on which the OSD image may be superimposed in some cases, and the control unit extracts the plurality of high brightness regions from a second region determined by removing the first region from the image.

15. The electronic apparatus according to claim 14, wherein the acquiring unit acquires the image from an image transmission apparatus, and in a case where an output terminal of the image transmission apparatus is an output for monitoring, the region detecting unit detects a predetermined range of an edge portion of the image, as the first region.

16. The electronic apparatus according to claim 14, wherein the acquiring unit acquires the image from an image transmission apparatus, and in a case where information on a superimposed position of the OSD image from the image transmission apparatus by communication, the region detecting unit detects the superimposed position as the first region.

17. The electronic apparatus according to claim 14, wherein the acquiring unit acquires the image from an image transmission apparatus, and in a case where information on a superimposed position of the OSD image is included in an additional information attached to the image transmitted from the image transmission apparatus, the region detecting unit detects the superimposed position as the first region.

18. The electronic apparatus according to claim 14, wherein the region detecting unit detects a region of text or graphics included in the image, as the first region.

19. A method for controlling an electronic apparatus comprising:

acquiring an image;

acquiring a position of an indicator which is displayed at a currently selected position in the acquired image; and in a case where the acquired image includes a plurality of high brightness regions, selecting one of the plurality of high brightness regions in the acquired image based on a distance between each of the plurality of high brightness regions and the indicator, wherein each of the plurality of high brightness regions is a region consisting of a plurality of pixels of the acquired image of which brightness values are higher than a first brightness value.

20. A non-transitory computer readable medium that stores a program, wherein the program causes a computer to execute a method for controlling an electronic apparatus, the method comprising:

acquiring an image;

acquiring a position of an indicator which is displayed at a currently selected position in the acquired image; and in a case where the acquired image includes a plurality of high brightness regions, selecting one of the plurality of high brightness regions in the acquired image based on a distance between each of the plurality of high brightness regions and the indicator, wherein each of the plurality of high brightness regions is a region consisting of a plurality of pixels of the acquired image of which brightness values are higher than a first brightness value.

* * * * *